United States Patent [19]

Nagano et al.

[11] 4,090,994

[45] May 23, 1978

[54] PROCESS FOR PREPARING A POLYVINYLCHLORIDE COMPOSITION BY POLYMERIZATION IN THE PRESENCE OF MOLDING ADDITIVES

[75] Inventors: Mineo Nagano; Michio Saitoh; Shigeru Awazawa; Koji Tanaka, all of Yokkaichi, Japan

[73] Assignee: Toyo Soda Manufacturing Co., Ltd., Japan

[21] Appl. No.: 647,563

[22] Filed: Jan. 8, 1976

[30] Foreign Application Priority Data

Jan. 11, 1975 Japan .................................. 50-5298

[51] Int. Cl.$^2$ .............................................. C08F 2/44
[52] U.S. Cl. ........................ 260/31.8 R; 260/23 XA; 260/28.5 D; 260/30.6 R; 260/45.75 T; 260/47.75 V; 260/42.18; 260/42.21; 260/42.47; 260/42.53; 260/857 G; 260/860; 260/878 R; 260/899; 264/331; 526/78; 526/201

[58] Field of Search ............... 526/201, 78; 260/42.53, 260/34.2, 878 R, 889, 31.8 R

[56] References Cited

U.S. PATENT DOCUMENTS 3,692,718 9/1972 Golstein ......................... 260/23 XA

*Primary Examiner*—Stanford M. Levin
*Attorney, Agent, or Firm*—Oblon, Fisher, Spivak, McClelland & Maier

[57] ABSTRACT

A process for preparing a polyvinylchloride composition by polymerizing vinyl chloride or vinyl chloride and a comonomer comprises polymerizing vinyl chloride or a mixture of vinyl chloride and a comonomer in the gaseous phase under a polymerization pressure which is less than the saturated vapor pressure of vinyl chloride at the polymerization temperature, in the presence of additives required for later formation of a molded product.

5 Claims, No Drawings

PROCESS FOR PREPARING A POLYVINYLCHLORIDE COMPOSITION BY POLYMERIZATION IN THE PRESENCE OF MOLDING ADDITIVES

BACKGROUND OF THE INVENTION

1. Field of the Invention

The present invention relates to a process for preparing a composition of a homopolymer or a copolymer of vinyl chloride (hereinafter referred to as a vinyl chloride or polyvinylchloride polymer). More particularly, it relates to a process for producing a polyvinylchloride composition which is suitable for use in a molding process.

2. Description of the Prior Art

In the past, in order to mold polyvinylchloride, suitable additives are blended with the polyvinylchloride depending upon which molding process is being employed. Conventional processes for preparing a polyvinylchloride composition containing such additives wherein the polyvinylchloride is blended with the additives, include the method of blending the polyvinylchloride with the additive while heating, followed by pelletizing by a pelletizer. Also included is the method of blending while heating to form a gel, followed by treatment of the gel to form a powder compound.

Moreover, all the conventional methods require the complicated steps of heating and blending. It would be most desirable to have a method for preparing a polyvinylchloride composition which did not require these industrially disadvantageous steps.

SUMMARY OF THE INVENTION

Accordingly, it is an object of the present invention to provide a process for preparing a polyvinylchloride composition containing desirable additives without requiring the aforementioned complicated steps.

Briefly, this and other objects of this invention as will hereinafter become clear, have been attained by providing a process for preparing a polyvinylchloride composition by polymerizing vinyl chloride or vinyl chloride and a comonomer which comprises polymerizing vinyl chloride or a mixture of vinyl chloride and a comonomer in the gaseous phase under a polymerization pressure which is less than the saturated vapor pressure of vinyl chloride at the polymerization temperature, in the presence of additives required for later formation of a molded product.

DETAILED DESCRIPTION OF THE PREFERRED EMBODIMENTS

The polymerization pressure should be lower than the saturated vapor pressure of the vinyl chloride monomer at the polymerization temperature employed. The ratio ($P_p/P_s$) of the polymerization pressure ($P_p$) to the saturated vapor pressure of vinyl chloride ($P_s$) is preferably in the range of 0.7 - 0.99. When the ratio $P_p/P_s$ is less than 0.7, the productivity is too low. When the polymerization pressure is too close to the saturated vapor pressure of vinyl chloride monomer, the formation of scale ensues and other difficulties may be caused.

The polymerization temperature is chosen in accordance with conventional polymerization considerations, as disclosed in many references. It is preferred to be in the range of 40°-70° C.

The time of polymerization is preferably in the range of from 2 hours to 12 hours, preferably from 4 hours to 8 hours.

A polymerization initiator is used in the polymerization of this invention. Suitable initiators include radical polymerization initiators used in the conventional polymerization reaction of vinyl chloride such as azobisnitrils, alkyl peroxides, peroxy esters, peroxydicarbonates and the like. The type of polymerization in which the invention is employed is not critical and includes a batch system, or a continuous system in which may be provided either a mechanical stirring system or a gas flow system. A continuous process wherein vinyl chloride monomer is recycled through a fluidized bed may be used.

In the process of this invention, copolymers may be produced by adding an amount of comonomer to the vinyl chloride in the range of up to 60 wt% relative to the total weight of monomer. Suitable comonomers include monomers which are copolymerizable with vinyl chloride among which are vinyl acetate, ethylene, propylene and the like. In addition, polymers such as ethylenevinyl acetate copolymer which is copolymerizable with vinyl chloride monomer can be used for this purpose.

A principal feature of this invention is that vinyl chloride is polymerized in the gaseous phase in the presence of all desired additives which are in powdery form. While it is customary to polymerize vinyl chloride in the gaseous phase to prepare a homopolymer of vinyl chloride as shown in U.S. Pat. No. 3,692,718, in this invention, it is also possible to introduce a comonomer together with the vinyl chloride so as to prepare a copolymer of vinyl chloride. Conventional methods for the polymerization of vinyl chloride in the gaseous phase can be used. One is to eject liquid vinyl chloride into the reactor under a suitable pressure for vaporizing vinyl chloride. Another is to introduce gaseous vinyl chloride directly into the reactor. In either, use of a polymerization pressure lower than the saturated vapor pressure of vinyl chloride at the polymerization temperature is the required condition for the polymerization of vinyl chloride in the gaseous phase.

In the polymerization of this invention, it is necessary to include in the polymerization system a solid substrate material upon which the polymerization occurs. Polyvinylchloride prepared by the conventional polymerization processes of suspension polymerization, block polymerization or gas phase polymerization is preferred for the substrate material. However, copolymers of vinyl chloride, or other polymers or monomers can also be used for this purpose. Suitable substrate materials include polyvinyl chloride copolymers such as vinyl chloride-ethylene polymer, vinyl-chloride-vinylacetate polymer, vinyl chloride-ethylene-vinylacetate polymer; polyolefins such as polyethylene, polypropylene, polyesters, polyamides, polyacrylates and the like. It is preferred to use polyvinyl chloride or a copolymer thereof as the substrate material as shown in the examples. Gaseous vinyl chloride is polymerized principally on the surface of the substrate material. The substrate material should be in the form of finely divided particles having an average particle size ranging from 10 to 500 μm, preferably from 50 to 300 μm. The amount of the solid substrate material to be used is from 10 to 1000 wt%, preferably from 30 to 300 wt% based on the amount of the polymer to be formed.

The additives to be used in the process of this invention are those conventionally incorporated in polyvinylchloride for molding purposes. These include stabilizers, lubricants, chelating agents, antioxidants, coloring agents, fillers, reinforcing materials and plasticizers. Suitable stabilizers include inorganic salts such as lead sulfite-phosphite or dibasic lead sulfate, organic acids or their salts such as stearic acid, lead stearate or calcium stearate, or organometallic compounds such as dibutyltinmaleate. Suitable lubricants, chelating agents and antioxidants include such agents as polyethylene wax, triphenyl phosphite and phenol derivatives, respectively. Suitable coloring agents include such pigments as titanium oxide, carbon black or quinacridone pigment. Suitable fillers and reinforcing materials include such substances as calcium carbonate and glass fibers. Suitable plasticizers include dibutyl phthalate and dioctyl phthalate. These additives can be used in forms of powders, fibers and the like. Liquids may also be used as long as clumping is avoided. It is desirable that the additives have a particle size ranging from 10 to 500 μm, preferably from 50 to 300 μm, when they are used in the preferred form of powders which can easily be stirred. The amount of the additives to be used is preferably 0.01 – 4 wt parts of inorganic salts used as stabilizers for 100 wt parts of the polymer to be formed in the polymerization, and also 0.05 – 6 wt parts of organic acids and salts thereof, organometallic compounds and other organic compounds (including high molecular weight compounds) for 100 wt parts of the polymer to be formed in the polymerization. It is unnecessary to include all of these additives. It is possible to add only an organometallic compound and an organic compound. The amounts of the coloring agent, the filler, the reinforcing material and the plasticizer are not critical. The amounts of these additives are generally up to 100 wt parts for 100 wt parts of the polymer to be formed in the polymerization.

These additives can be added before the initiation of the polymerization and/or during the polymerization as desired. Prior addition is preferred. The additives can be directly added to the polymerization system or can be added after being diluted with a conventional solvent or with the vinyl chloride monomer. The additives can be also added by premixing with the substrate material with or without additional heat-treatment. Moreover, they may be fluidized in a batch or continuous system.

In the process of this invention, additives required for the formation of a molded product are added before or during the polymerization of vinyl chloride with or without a comonomer. Accordingly, blending of the additives with already formed polyvinylchloride is unnecessary. The polyvinylchloride composition prepared by the process of this invention can subsequently be processed in the molding step without blending all additives required. That is, addition of further additives to the composition before or during the molding operation is not excluded. The characteristics of the composition prepared by the process of this invention are superior to those of the composition prepared by blending of the additives with polyvinylchloride. The compositions of this invention are especially suitable for use in extrusion molding or injection molding operations.

Having generally described the invention, a more complete understanding can be obtained by reference to certain specific examples, which are included for purposes of illustration only and are not intended to be limiting unless otherwise specified.

In the Examples, the amount of vinyl chloride monomer introduced into the autoclave was 100 wt parts in each case.

EXAMPLE 1

In a 100 liter reactor equipped with a double screw type stirrer, the following components were charged and mixed.

| Substrate material: | wt. parts |
|---|---|
| Polyvinylchloride (Average particle size: 150 μm) | 41 |
| Additives: | |
| Lead sulfite-phosphite | 0.7 |
| Dibasic lead sulfate | 0.3 |
| Lead stearate | 1.0 |
| Calcium stearate | 0.2 |
| Stearic acid | 0.4 |
| Coloring agent (color batch) | 0.15 |

The polymerization was carried out and continued while liquid vinyl chloride monomer was charged by ejection under a pressure of 7.1 kg/cm$^2$ G at 57° C for 8 hours. 0.28 wt. part of a t-butyl-peroxydecanate polymerization initiator was charged by dissolving it in the liquid vinyl chloride monomer to be introduced. A ($P_p/P_s$) value of 0.77 was maintained during the polymerization. The polyvinylchloride composition prepared by the polymerization, in an amount of 100 wt. parts of the formed polymer, had a bulk density of 0.64 g/cm$^3$ and an average particle diameter of 180 μm. The resulting composition, without addition of further additives, was fed into a biaxial extruder for molding of a pipe. The rate of production of the molding operation using the composition of this invention was twenty percent higher than the rate of the molding operation using a conventional composition prepared by blending polyvinylchloride with the above-mentioned additives.

EXAMPLE 2

The following components were charged into the autoclave used in Example 1.

| Substrate material: | Wt. parts |
|---|---|
| Polyvinylchloride (Average particle size: 150 μm) | 40 |
| Additives: | |
| Lead sulfite-phosphite | 1.0 |
| Dibasic lead sulfate | 0.5 |
| Lead stearate | 1.3 |
| Calcium stearate | 0.4 |
| Stearic acid | 0.5 |
| Coloring agent (color batch) | 0.19 |

The polymerization was carried out and continued by introducing gaseous vinyl chloride monomer under a pressure of 7.9 kg/cm$^2$ G at 57° C for 8 hours. 0.19 wt. part of a azobisvaleronitril polymerization initiator dissolved in a small amount of liquid vinyl chloride monomer was charged into the polymerization chamber. A ($P_p/P_s$) value of 0.86 was maintained during the polymerization. The resulting polyvinylchloride composition prepared by the polymerization, in which the amount of the formed polymer was 100 wt. parts, had a bulk density of 0.65 g/cm$^3$ and an average particle diameter of 183 μm. Without addition of further additives, the composition was fed into a biaxial extruder for molding a pipe. The rate of production of the molding operation using the composition of this invention was twenty percent higher than the rate of the molding operation using a conventional composition prepared by blending polyvinylchloride with the above-mentioned additives.

EXAMPLE 3

The following components were charged into the autoclave used in Example 1.

| Substrate material: | Wt. parts |
|---|---|
| ethylene/vinylacetate-vinyl chloride graft copolymer consisting of 7 wt. % of a base polymer of ethylene-vinylacetate copolymer (which consists of 76 wt. % of ethylenic sequence and 24 wt. % of vinylacetate sequence) and 93 wt. % of polyvinylchloride graft polymerized onto the base polymer. | 40 |
| Additives: | |
| Lead sulfite-phosphite | 0.7 |
| Dibasic lead sulfate | 0.3 |
| Lead stearate | 1.0 |
| Calcium stearate | 0.4 |
| Stearic acid | 0.4 |
| Coloring agent (color batch) | 0.19 |

The polymerization was carried out while introducing liquid vinyl chloride monomer by ejection into the autoclave under a polymerization pressure of 7.1 kg/cm$^2$ G at 57° C. These polymerization conditions as well as a ($P_p/P_s$) value of 0.77 were maintained for the polymerization for 8 hours, while 0.22 part of azobisvaleronitril was charged as the polymerization initiator, dissolved in the liquid vinyl chloride monomer to be introduced. At the same time, an ethylene-vinyl acetate copolymer was dissolved in the liquid vinyl chloride monomer to be introduced and charged into the autoclave together with the liquid vinyl chloride monomer so as to form a polymerization product of ethylene-vinyl acetate-vinyl chloride graft copolymer containing ethylene-vinyl acetate units in an amount ranging from 6 to 7 wt. %. The resulting composition of polyvinylchloride prepared by the polymerization, in which the formed polymer was 100 wt. parts in amount, had a bulk density of 0.65 g/cm$^3$ and an average particle diameter of 180 μm. Without addition of further additives, the composition was fed into a biaxial extruder for molding of a pipe. The rate of production of the molding operation using the composition of this invention was twenty percent higher than the rate of the molding operation using a conventional composition prepared by blending polyvinylchloride and the above-mentioned additives.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for preparing a moldable colored stabilized polyvinylchloride composition which is moldable without the later addition of additives required to formulate a molding product after polymerizing vinyl chloride or vinyl chloride and a comonomer which comprises the step of (a) polymerizing vinyl chloride or a mixture of vinyl chloride and a comonomer in the gaseous phase under a polymerization pressure which is less than the saturated vapor pressure of vinyl chloride at the polymerization temperature in the presence of a powdered vinyl chloride polymer of average particle size 10–500μm as a solid substrate and including the step of (b) charging stabilizer and coloring agent to the polymerization system, the vinyl chloride polymerization being carried out in the presence of additives to form a moldable composition, which additives are all the additives required in the molded product formed from the moldable composition to function as stabilizer, lubricants, chelating agents, antioxidants, coloring agents, filler, reinforcing materials and plasticizers in the said molded product, all of said additives when required in the molded product being charged to the polymerization system before or during polymerization, and including said stabilizer and coloring agent of step (b), with the proviso that the additives functioning as stabilizers, lubricants, chelating agents or antioxidants are inorganic metal compounds, organic metallic compounds or organic compounds or mixtures thereof, inorganic metal compound additives, when present, being present in the amount of 0.01 to 4 wt. parts and organic metallic compounds and organic compound additives, when present, being present in 0.05 to 6 wt. parts for every 100 parts of polymer formed, and with the further proviso that all the additives and the solid substrate are fluidized in a powdery form in a fluidized bed and vinyl chloride monomer is recycled through the fluidized bed.

2. The process of claim 1, wherein gaseous vinyl chloride is introduced.

3. The process of claim 1, wherein liquid vinyl chloride is ejected into the polymerization chamber under conditions for vaporizing vinyl chloride.

4. A process for preparing a moldable composition of polyvinyl chloride grafted upon an ethylene-vinyl acetate copolymer which comprises the steps of (a) introducing liquid vinyl chloride containing the dissolved ethylene-vinyl acetate copolymer under conditions in which the vinyl chloride is vaporized into a reactor containing powdered polyvinyl chloride grafted onto ethylene-vinyl acetate copolymer and at a polymerization pressure lower than the saturated vapor pressure of vinyl chloride at the polymerization temperature, (b) charging stabilizer to the polymerization system, polymerizing the vinyl chloride in the presence of additives to form a moldable product which additives are all the additives required in the molded product from the moldable composition, said moldable composition including, as additives, stabilizers and other required additives, to function as stabilizers, lubricants, chelating agents, coloring agents, filler, reinforcing materials and plasticizers in the said molded product, all of said additives when required in the molded product being charged into the reactor before or during polymerization and including said stabilizer of step (b), with the proviso that the additives functioning as stabilizers, lubricants, chelating agents or antioxidants are inorganic metal compounds, organic metallic compounds or organic compounds or mixtures thereof, inorganic metal compound additives when present, being present in the amount of 0.01 to 4 wt. parts and organic metallic compounds and organic compound additives, when present, being present in 0.05 to 6 wt. parts for every 100 parts of polymer formed.

5. The process of claim 4, wherein the additives charged into the reactor before or during polymerization include all the coloring material required to form a colored molded product.

* * * * *